Figure 1:
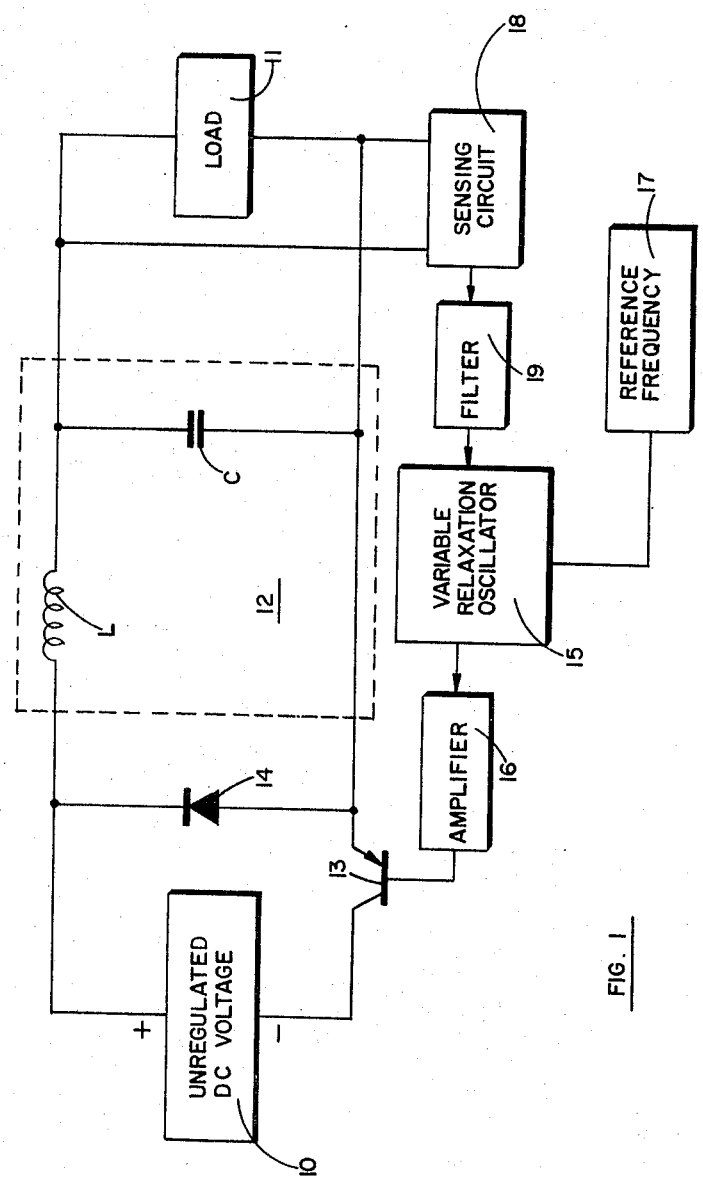

INVENTORS
PAUL A. BEIHL
JAMES R. GANDY
MARVIN W. LOOSLE
BY
A. M. Fernandez
ATTORNEY

United States Patent Office 3,305,767
Patented Feb. 21, 1967

3,305,767
VOLTAGE REGULATOR
Paul A. Beihl, La Habra, and James R. Gandy, Garden Grove, Calif., and Marvin W. Loosle, Salt Lake City, Utah, assignors to North American Aviation, Inc.
Filed Sept. 10, 1963, Ser. No. 307,984
5 Claims. (Cl. 323—22)

This invention pertains to a voltage regulator, and particularly to a D.C. voltage regulator of the pulse-width-modulated type.

A basic pulse width modulated (PWM) voltage regulator comprises a switch cyclically closed to connect a source of unregulated voltage in series with a filter. Control of the output voltage from the filter is achieved by controlling the duty portion or timing period of each switching cycle during which the switch is open or closed. Automatic control for voltage regulation is then provided by simply sensing variations in output voltage and inversely varying the timing period.

In some prior art PWM voltage regulators, the switch is operated in response to the amplified ripple portion of the output voltage. However, it is difficult to maintain the switching frequency constant in such a regulator due to variation in gain of the amplifying feedback circuit. Moreover, for an A.C. load, the operation of the switch tends to be at the same frequency as the operation of the load. Since the power loss in the regulator is proportional to switching frequency, it is desirable to maintain the switching frequency constant and vary only the timing period of each complete cycle.

In other prior PWM voltage regulators, the timing period of each cycle is varied in response to variations in the output voltage through a voltage-sensitive circuit, such as a Schmitt circuit. However, such a feedback arrangement for voltage regulation has been found to be unsatisfactory for most applications because a voltage sensitive circuit of that type is unduly sensitive to transients or noise.

Accordingly, an object of the present invention is to provide an improved voltage regulator.

Another object of the invention is to provide a PWM voltage regulator having a constant switching frequency and means for varying the timing period of each switching cycle in response to variations in the output voltage without undue sensitivity to noise transients.

Still another object is to provide over voltage protection.

These and other objects of the invention are realized by providing a type of relaxation oscillator which assumes a second conductive state for a specified timing period out of each constant cyclical period, and which automatically returns to a first state at the end of the timing period. Means for varying the timing period inversely proportional to variations in output voltage is provided. A switch responsive to a predetermined output voltage magnitude automatically changes the specified timing period to a predetermined minimum for protection of the regulating circuit for output voltages over the predetermined magnitude.

Figure 2:
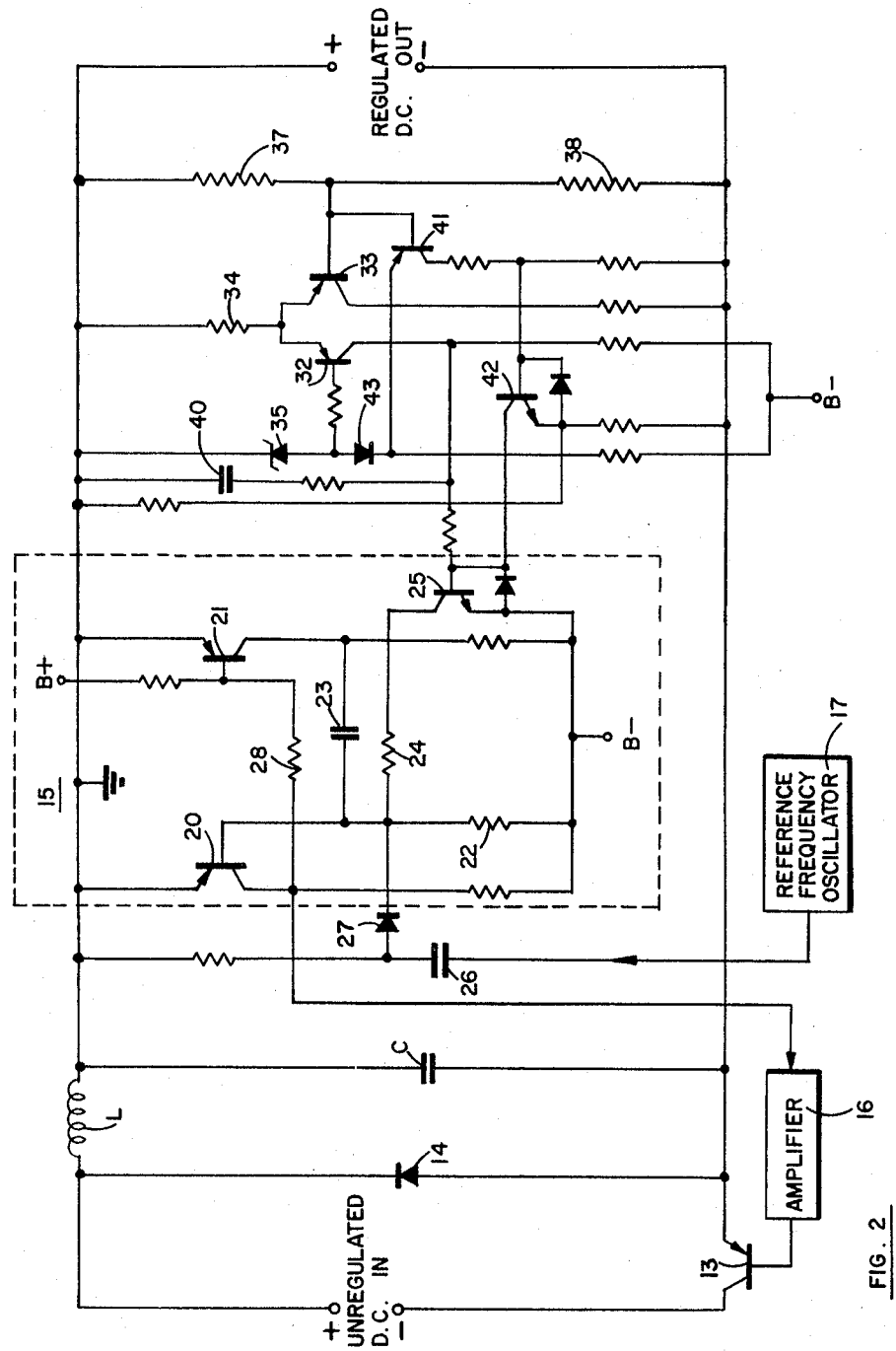

Other objects and advantages will become apparent from the following description with reference to the drawings in which:

FIG. 1 is a schematic block diagram of a voltage regulator constructed in accordance with this invention; and FIG. 2 is a schematic diagram of a preferred embodiment of this invention.

In the schematic block diagram of FIG. 1 a source of unregulated D.C. voltage 10 is coupled to a load 11 by a filter 12 to provide controlled load voltage in response to cyclical operation of a switch 13. When the switch is closed, the output voltage to the load increases slowly since the choke coil L of the filter tends to resist instantaneous change of current. When the switch is open, the output voltage decreases slowly for the same reasons. A diode 14 provides a current path while the switch 13 is open.

In theory, the output voltage is in the same proportion to the input voltage as the duty portion or time during which the switch 13 is closed is to the total cyclical period but in actual practice there is some loss through the controlling circuit. For instance, if L equals 5 millihenries, C equals 2,000 microfarads, and the resistance of the coil $R_L$ equals 4 ohms, the output voltage is approximately 18 volts D.C. (with a ripple of about 200 millivolts) when an input voltage equal to 38 volts D.C. is applied with a switching frequency of 1.5 kc. and a duty portion or timing period equal to half the total cyclical period. To increase the output voltage, the duty portion of the switch 13 is increased proportionately. Similarly, to decrease the output voltage, the duty portion is proportionately decreased.

For voltage regulation in accordance with the present invention, a synchronized variable relaxation oscillator 15 drives the switch 13 through an amplifier 16. A reference oscillator 17 produces short trigger pulses to synchronize the relaxation oscillator 15 as a constant frequency, such as 1.5 kc. The internal timing network of the relaxation oscillator 15 is designed to provide a duty portion or timing period of each switching cycle equal to approximately half the total period of a reference frequency oscillator cycle. In that manner 18 volts is delivered to the load 11 from a 38 volt unergulated D.C. source 10 under the control of the relaxation oscillator 15 for the parameters of the foregoing specific example.

To provide regulation of the output voltage to the load 11 in accordance with the present invention, the duty portion or timing period of each switching cycle is varied inversely proportional to variations in the output voltage by varying the timing period of the relaxation oscillator 15 in response to variations in the output voltage. A circuit 18 is provided to sense variations in the output voltage. A bandpass filter 19 is employed to couple the output of the sensing circuit 18 to the variable relaxation oscillator in order to reduce output ripple and thereby prevent the relaxation oscillator from receiving an alternating signal at the same frequency as the synchronizing trigger pulses applied to the relaxation oscillator 15 from the reference frequency oscillator 17. Otherwise, the relaxation oscillator would tend to switch according to the peak-to-peak voltage instead of the average voltage to the load. The result would then be an oscillation of the relaxation oscillator timing period.

In an embodiment illustrated in FIG. 2, the synchronized variable relaxation oscillator 15 comprises a monostable multivibrator consisting of two cross-coupled transistors 20 and 21, an RC timing circuit including a resistor 22 and a capacitor 23, and a variable impedance means connected in parallel with the resistor 22 consisting of a resistor 24 in series with a transistor 25.

In the quiescent condition, the transistor 20 is held conducting at saturation by a negative bias potential applied to its base electrode through the resistor 22. Positive pulses from the reference frequency oscillator 17 are coupled by a capacitor 26 and a diode 27 to the base of the transistor 20. The transistor 20 is then abruptly cut off by a regenerative action which ensues driving the transistor 21 completely below cut-off through a cross coupling resistor 28. The collector voltage of the transistor 21 is then at the positive output voltage being delivered to the load. The base electrode of the transistor 20 is abruptly driven to the same positive voltage because the voltage across the capacitor 23 cannot change instantaneously.

The transistor 20 remains cut off for a period determined by the time required for the capacitor 23 to charge through the resistor 22 in parallel with the series circuit comprising the resistor 24 and the transistor 25. When the capacitor 23 has been sufficiently charged in the negative direction to turn the transistor 20 back on, a regenerative action again ensues abruptly driving the transistor 20 to saturation and cutting transistor 21 off. Thus the duty portion or timing period of each switching cycle is determined by the RC time constant of the capacitor 23 and the resistor 22 in parallel with the variable resistance circuit consisting of the resistor 24 and transistor 25.

Both the resistor 22 and the emitter of the transistor 25 are connected to B— instead of the more positive bias potential of the emitters of transistors 20 and 21 in order to provide more stable timing of the second condition, namely the condition under which the transistor 20 is cut off and the transistor 21 is conducting.

The maximum time the multivibrator is in the second state is when the transistor 25 is cut off and the resistance of the parallel circuit including the resistors 22 and 24 is therefore at a miximum. With a 1.5 kc. synchronizing signal, the total cycle is approximately 667 microseconds. The minimum time the multivibrator is in the second state is when transistor 25 is conducting at saturation. In the illustrated embodiment, the RC timing circuit comprising the capacitor 23, the resistors 22 and 24 and transistor 25 provide a range of regulation from approximately 5 percent to almost 90 percent of the unregulated D.C. voltage input. Thus if the desired regulated D.C. output voltage is selected to be approximately half of —38 volts, or —18 volts, a regulated output can be maintained for variations in the input voltage over a wide range from approximately —20 volts to almost —360 volts.

The output of the monostable multivibrator 15 is directly connected to the amplifier 16 which drives the switch 13. The amplifier itself may consist of one or more cascaded voltage amplifying circuits and one or more current amplifying circuits. The switch 13 may comprise two or more transistors in parallel, each with a separate emitter resistor to assure equal division of load current in order to provide sufficient current capacity for the particular application of the voltage regulator.

The reference frequency oscillator 17 may comprise a unijunction transistor relaxation oscillator or any other stable frequency oscillator circuit. In order to provide short positive pulses to the multivibrator it is preferred that the reference frequency oscillator 17 be a pulse generator, each pulse having a sharp positive rise on the leading edge which may be differentiated by the RC coupling provided.

The sensing circuit consists of a differential amplifier comprising transistors 32 and 33 having a common emitter resistor 34. A zener diode 35 provides a reference voltage for the base electrode of the transistor 32. A voltage dividing network comprising resistors 37 and 38 provides a voltage signal at the base of the transistor 33 which is proportional to the output voltage for comparison with the reference voltage derived from the zener diode 35. For example, if the regulated output voltage is to be —18 volts, the resistors 37 and 38 are selected to provide a fraction of that voltage, such as —6.2 volts, and the zener diode 35 is selected to provide as a reference a corresponding voltage. In that manner, when the output voltage is —18 volts, the voltage at the base of the transistor 33 is —6.2 volts and the differential output from the collector of the transistor 32 to the base of the transistor 25 is at zero volts which is a nulled condition that establishes the equivalent resistance of the resistor 24 and the transistor 25 in series approximately equal to that of the resistor 22.

For a deviation of the output voltage from —18 volts, a proportional deviation of the voltage at the base of the transistor 25 is produced by the differential amplification of the transistors 32 and 33. For instance, with the positive output terminal grounded as shown, if the output voltage increases, the base of the transistor 33 becomes more negative relative to the emitter and the emitter current increases, causing a corresponding decrease in the emitter current of the transistor 32, thereby causing its collector voltage to become more negative. Since the transistor 25 is of the opposite conductivity type as the transistor 32, namely an NPN type transistor, when the collector of the transistor 32 drives the base of the transistor 25 more negative the collector current through the transistor 25 decreases thereby increasing the resistance of the parallel circuit comprising the resistor 22 and the resistor 24 in series with the transistor 25. That effectively increases the RC time constant of the timing circuit of the multivibrator 15 to increase the timing period of each switching cycle for the switch 13 to cause a decrease in the output voltage to its original value of 18 volts. If the output voltage decreases, the base of the transistor 33 becomes more positive and its emitter current decreases, thereby causing the collector of transistor 32 to become more positive. The collector current of the transistor 25 then increases, causing a decrease in the RC time constant of the timing circuit in the multivibrator 15 to decrease the timing period of each switching cycle of the switch 13 and thereby increase the output voltage to its original value.

It should be noted that in this illustrative embodiment, the feedback voltage from the sensing circuit is employed to change the timing circuit in the same sense. Accordingly, to obtain a change in the output voltage of the opposite sense for regulation, the timing period is actually employed to control the off time or non-duty portion of each cycle. To control the on time instead, the output to the base of the transistor 25 should be taken from the collector of the transistor 33. However, control of the off time is equivalent to control of the on time so that it is sufficient to vary the timing period proportional to variations in the output voltage. If the timing period is varied directly proportional as shown in FIG. 2, the off time of the switch 13 is controlled by the timing circuit of the monostable multivibrator. If the timing period is varied inversely proportional, the on time of the switch is controlled. For such a phase reversal, it would be sufficient to either take the output to the amplifier 16 from the collector of the transistor 21. However, it would be desirable to add a phase inverting stage to the amplifier 16 instead in order to not load the transistor 21 and thereby place additional impedance in parallel with the resistor 22.

A filtering capacitor 40 of approximately 800 microfarads for a reference frequency of 1.5 kc. is connected to the output of the differential amplifier (collector of transistor 32) to reduce ripple in the output voltage to the transistor 25 and thereby prevent the monostable multivibrator from receiving an A.C. signal at the same frequency as the reference frequency from the oscillator 17. Such an A.C. signal to the base of the transistor 25 would cause the monostable multivibrator to switch according to the peak-to-peak output voltage instead of the average voltage which in the present example is —18 volts D.C. The result would be an oscillatory variation of the timing period which would cause an oscillatory variation in the regulated output voltage.

When the unregulated D.C. voltage input is first turned on or applied to the voltage regulator, the filter capacitor C must be fully charged before full regulation can be obtained. In addition, the filter capacitor 40 decreases the frequency response of the circuit thereby further slowing the response of the circuit during the initial charging period of the filter capacitor C. Thus an initial voltage overshoot during turn-on of the regulator which may last as long as one second may be expected. During such an overshoot, the output voltage may increase up to the input voltage and damage components in the load. Accordingly, it is desirable to keep the output voltage below a predetermined maximum level such as −25 volts in the present example. To accomplish that, a circuit which bypasses the differential amplifier and filter capacitor 40 is provided. That circuit comprises transistors 41 and 42. When the output voltage exceeds about 20 volts, the transistor 41 is turned on which then turns on the transistor 42. A diode 43 connected between the emitter of the transistor 41 and the zener diode 35 reverse biases the transistor 41 until the regulated output voltage increases beyond −20 volts. Since the transistor 42 is of an opposite conductivity type as the transistor 41, when the transistor 41 is turned on the transistor 42 is also turned on. The transistor 25 is then cut off increasing the RC time constant of the timing circuit to a maximum and decreasing the timing period of each switching cycle of the switch 13 to a minimum to decrease the output voltage. As the output voltage decreases, the transistor 41 will again be reverse biased causing the transistor 42 to be cut off and the output voltage to increase. In that manner the output voltage will remain near −20 volts until the filter capacitor charges sufficiently to introduce an appropriate feedback signal to the base of the transistor 25 to regulate the output voltage at −18 volts.

While the principles of the invention have now been made clear in an illustrative embodiment, there will be immediately obvious to those skilled in the art many modifications in structure, arrangement, proportions, the elements, and components, used in the practice of the invention, and otherwise, which are particularly adapted for specific environments and operating requirements, without departing those principles. The appended claims are therefore intended to cover and embrace any such modifications, within the limits only of the true spirit and scope of the invention.

What is claimed is:

1. In a system for producing a regulated voltage through a circuit including a filter adapted to have its output coupled to a load and a switch for cyclically connecting a source of unregulated voltage to the input of said filter, the combination comprising
    constant frequency source means,
    cyclical means for closing said switch in response to said constant frequency source means whereby said unregulated voltage is cyclically connected to said filter in response to said cyclical means,
    means for sensing the output voltage of said filter, and
    variable means coupled to said sensing means for varying the timing period of said cyclical means proportional to variation of said output voltage.

2. In a system for producing a regulated voltage through a circuit including a filter adapted to have its output coupled to a load and a switch for cyclically connecting a source of unregulated voltage to the input of said filter, the combination comprising,
    a relaxation oscillator,
    means coupling said oscillator to said switch whereby said unregulated voltage is cyclically connected to said filter in response to said oscillator,
    means for sensing the output voltage of said filter, and
    variable means coupled to said sensing means for varying the timing period of said relaxation oscillator proportional to variation of said output voltage,
    means for detecting any output voltage of said filter over a predetermined magnitude, and
    means coupled to said over-voltage detecting means for causing said variable means to vary the timing period of said relaxation oscillator to a minimum.

3. In a system for producing a regulated voltage through a circuit including a filter adapted to have its output coupled to a load and a switch for cyclically connecting a source of unregulated voltage to the input of said filter, the combination comprising,
    a relaxation oscillator,
    means coupling said oscillator to said switch whereby said unregulated voltage is cyclically connected to said filter in response to said oscillator,
    means for sensing the output voltage of said filter, and
    variable means coupled to said sensing means for varying the timing period of said relaxation oscillator proportional to variation of said output voltage,
    said variable means comprises a resistor and a capacitor in series to form an RC timing circuit, and a variable impedance means connected in parallel with said resistor for varying the RC time constant thereof in response to variation of said output voltage.

4. In a system for producing a regulated voltage, the combination as defined in claim 1 wherein said cyclical means comprises,
    a synchronous monostable multivibrator having a pair of cross-coupled transistors, each of said transistors having a plurality of electrodes including a control electrode and at least collector and emitter electrodes,
    a bias source,
    a bias resistor connected to said bias source and the control electrode of a first of said transistors,
    a capacitor connected between said control electrode and the collector electrode of the other of said transistors,
    said variable means comprises a third transistor in parallel with said bias resistor and having control electrode coupled to said sensing means.

5. In a system for producing a regulated voltage, the combination as defined in claim 1, wherein said cyclical means comprises,
    a synchronous monostable multivibrator having a pair of cross-coupled transistors, each of said transistors having a plurality of electrodes including a control electrode and at least collector and emitter electrodes,
    a bias source,
    a bias resistor connected between said bias source and the control electrode of a first of said transistors,
    a capacitor connected between said control electrode and the collector electrode of the other of said transistors,
    said bias source having a potential of greater magnitude than is sufficient to cause said first transistor to conduct at saturation while said capacitors is storing current in a quiescent condition,
    said variable means comprises a third transistor having a plurality of electrodes including a control electrode connected to said sensing means and at least one collector and one emitter electrode, and first circuit means for connecting said bias resistor between said collector and emitter electrodes.

References Cited by the Examiner

UNITED STATES PATENTS

| | | | |
|---|---|---|---|
| Re. 24,671 | 7/1959 | Jensen | 323—22 |
| 2,912,637 | 11/1959 | Barnes et al. | 323—22 |
| 3,155,838 | 11/1964 | Brahm | 307—88.5 |
| 3,169,232 | 2/1965 | Engman et al. | 332—9 |
| 3,179,871 | 4/1965 | Bagno | 320—30 |
| 3,243,689 | 3/1966 | Perrins | 323—22 |

JOHN F. COUCH, *Primary Examiner.*

W. E. RAY, *Assistant Examiner.*